United States Patent
Rodriguez et al.

(10) Patent No.: US 7,103,621 B2
(45) Date of Patent: Sep. 5, 2006

(54) PROCESSOR EFFICIENT TRANSFORMATION AND LIGHTING IMPLEMENTATION FOR THREE DIMENSIONAL GRAPHICS UTILIZING SCALED CONVERSION INSTRUCTIONS

(75) Inventors: Ricardo Rodriguez, Raleigh, NC (US); Marco Jacobs, Einhoven (NL); David Strube, Raleigh, NC (US)

(73) Assignee: PTS Corporation, San Jose, CA (US)

( * ) Notice: Subject to any disclaimer, the term of this patent is extended or adjusted under 35 U.S.C. 154(b) by 147 days.

(21) Appl. No.: 10/403,476

(22) Filed: Mar. 31, 2003

(65) Prior Publication Data

US 2004/0113914 A1    Jun. 17, 2004

Related U.S. Application Data

(60) Provisional application No. 60/368,509, filed on Mar. 29, 2002.

(51) Int. Cl.
*G06F 7/00* (2006.01)
*G06F 7/38* (2006.01)

(52) U.S. Cl. ...................... 708/204; 708/498
(58) Field of Classification Search ............... 345/582, 345/583, 584, 585, 586, 426; 712/222; 708/208, 708/209, 498
See application file for complete search history.

(56) References Cited

U.S. PATENT DOCUMENTS 5,995,122 A * 11/1999 Hsieh et al. ................ 345/561

| 6,038,576 | A  | * | 3/2000  | Ulichney et al. ........... 708/208 |
| 6,518,974 | B1 | * | 2/2003  | Taylor et al. ............... 345/582 |
| 6,591,361 | B1 | * | 7/2003  | Liao et al. .................. 712/222 |
| 6,639,595 | B1 | * | 10/2003 | Drebin et al. ............... 345/426 |
| 6,700,584 | B1 | * | 3/2004  | Wood .......................... 345/581 |
| 2001/0023480 | A1 |   | 9/2001 | Abdallah et al. |
| 2002/0087609 | A1 |   | 7/2002 | Zohar |
| 2002/0133691 | A1 |   | 9/2002 | Elliott et al. |

FOREIGN PATENT DOCUMENTS

EP        1 249 784 A1    1/2002

OTHER PUBLICATIONS

M. Strauss, M. Jacobs and I. Greenberg: "Bops: Conquering the Geometry Pipeline", GDC 2000 Proceedings Archive, Programming Proceedings, 2000, pp. 1-18.

* cited by examiner

*Primary Examiner*—Kee M. Tung
*Assistant Examiner*—Aaron M. Richer
(74) *Attorney, Agent, or Firm*—Priest & Goldstein, PLLC

(57) ABSTRACT

Efficient techniques for computation of texture coordinates using scaled conversion operations for a 3D graphics pipeline utilizing a scaled floating point to integer instruction and a scaled integer to floating point instruction to significantly reduce memory requirements. A parallel array VLIW digital signal processor is employed along with specialized scaled conversion instructions and communication operations between the processing elements, which are overlapped with computation to provide very high performance operation. Successive iterations of a loop of tightly packed VLIWs are used allowing the graphics pipeline hardware to be efficiently used.

6 Claims, 18 Drawing Sheets

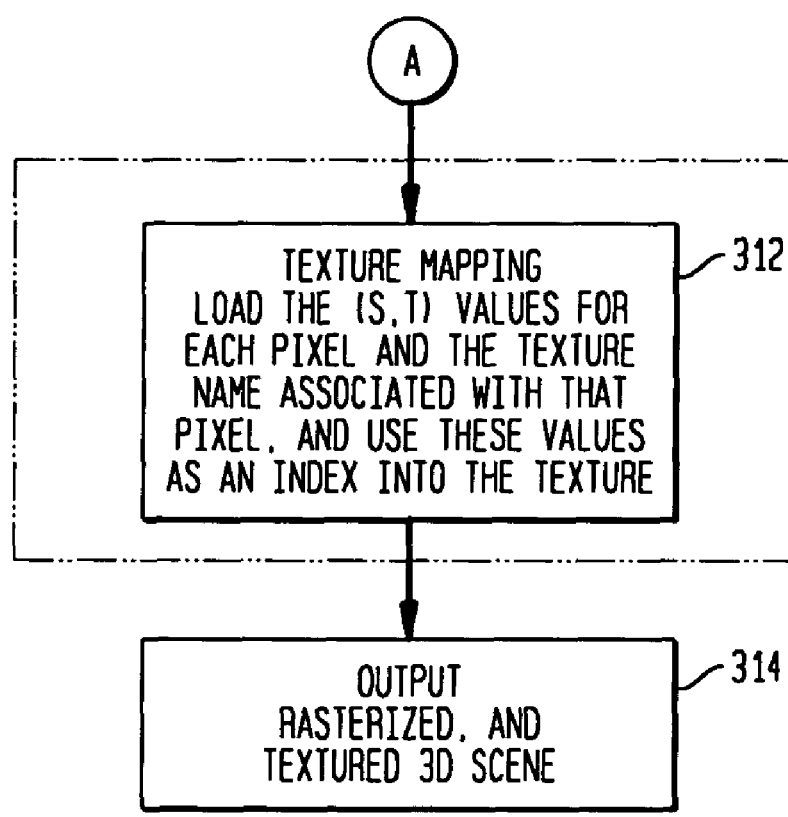

FIG. 5A

ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | UNIT | | DSUopcode FTOIS OPCODE | | | | | | Rt | | | | | Rx | | | | | 0 | | 111 | | | CnvrtExt | | | 0 | CE2 | |

500

DESCRIPTION

FIG. 5B

SINGLE PRECISION FLOATING-POINT TO SCALED INTEGER CONVERSION WITH VALUES -1.0, AND +1    510

| | FLOATING-POINT OPERAND | | INTERGER RESULT | ARITHMATIC FLAGS |
|---|---|---|---|---|
| | SIGN | VALUE | | |
| UNSIGNED OPERATION | 1 | Rx<0.0 | 0 | V=1 |
| | 1/0 | Rx=0.0 | 0 | V=0 |
| | 0 | Rx=1.0 | Max INT,UNSIGNED | V=0 |
| | 0 | Rx>1.0 | Max INT,UNSIGNED | V=1 |
| SIGNED OPERATION | 1 | Rx<(-1.0) | Min INT,SIGNED | V=1 |
| | 1 | Rx=(-1.0) | Min INT,SIGNED | V=0 |
| | 1/0 | Rx=0.0 | -1 | V=0 |
| | 0 | Rx=1.0 | Max INT,SIGNED | V=0 |
| | 0 | Rx>1.0 | Max INT,SIGNED | V=1 |

FIG. 5C    515

| CnvrtExt BACK | 4 | CONVERT EXTENSION<br>0000=1 W<br>0001=RESERVED<br>0010=1 H0<br>0011=1 H1<br>0100=1 B0<br>0101=1 B1<br>0110=1 B2<br>0111=1 B3<br>1000=2 W<br>1001=RESERVED<br>1010=2 H<br>1011=RESERVED<br>1100=2 B0<br>1101=RESERVED<br>1110=2 B2<br>1111=RESERVED<br>1000-1111=RESERVED |

517

FIG. 5D — 520
SYNTAX/OPERATION (SIGNED INTEGER)

| INSTRUCTION | OPERANDS | OPERATION | ACF |
|---|---|---|---|
| | | | WORD |
| FTOIS.[SP]D.1SW | Rt,Rx | $Rt \leftarrow ToInt(((2^{32}-1)*Rx)-1)/2)$ | NONE |
| [TF].FTOIS.[SP]D.1SW | Rt,Rx | DO OPERATION ONLY IF T/F CONDITION IS SATISFIED IN F0 | NONE |
| | | | HALFWORD |
| FTOIS.[SP]D.1SH | RtHt,Rx | $RtHt \leftarrow ToInt(((2^{16}-1)*Rx)-1)/2)$ (Ht REFERS TO REGISTER HALFWORD H0 OR H1) | NONE |
| [TF].FTOIS.[SP]D.1SH | RtHt,Rx | DO OPERATION ONLY IF T/F CONDITION IS SATISFIED IN F0 | NONE |
| | | | BYTE |
| FTOIS.[SP]D.1SB | RtBt,Rx | $RtBt \leftarrow ToInt(((2^{8}-1)*Rx)-1)/2)$ (Bt REFERS TO REGISTER BYTE B0,B1,B2 OR B3) | NONE |
| [TF].FTOIS.[SP]D.1SB | RtBt,Rx | DO OPERATION ONLY IF T/F CONDITION IS SATISFIED IN F0 | NONE |

FIG. 5E — 530
SYNTAX/OPERATION (UNSIGNED INTEGER)

| INSTRUCTION | OPERANDS | OPERATION | ACF |
|---|---|---|---|
| | | | WORD |
| FTOIS.[SP]D.1UW | Rt,Rx | $Rt \leftarrow ToInt((2^{32}-1)*Rx)$ | NONE |
| [TF].FTOIS.[SP]D.1UW | Rt,Rx | DO OPERATION ONLY IF T/F CONDITION IS SATISFIED IN F0 | NONE |
| | | | HALFWORD |
| FTOIS.[SP]D.1UH | RtHt,Rx | $RtHt \leftarrow ToInt((2^{16}-1)*Rx)$ (Ht REFERS TO REGISTER HALFWORD H0 OR H1) | NONE |
| [TF].FTOIS.[SP]D.1UH | RtHt,Rx | DO OPERATION ONLY IF T/F CONDITION IS SATISFIED IN F0 | NONE |
| | | | BYTE |
| FTOIS.[SP]D.1UB | RtBt,Rx | $RtBt \leftarrow ToInt((2^{8}-1)*Rx)$ (Bt REFERS TO REGISTER BYTE B0,B1,B2 OR B3) | NONE |
| [TF].FTOIS.[SP]D.1UB | RtBt,Rx | DO OPERATION ONLY IF T/F CONDITION IS SATISFIED IN F0 | NONE |

FIG. 5F1

```
FTOIS BASIC DATA FLOW
Begin:
exp[7:0]=exponent 8 bits.  402                                    590

If (exp=0) //Underflow  ⎫
{                       ⎪
  if(Signed)            ⎬ 424 AND 414
    Result=-1           ⎪
  Else                  ⎪
    Result=0            ⎪
}                       ⎭

If (exp>127) //Overflow          ⎫
{                                ⎬ 422 AND 414
  Result=Max Integer of data type⎭
} mantissa={hidden bit, Fraction}//Fraction with hidden bit set    404
shr-scale={0,~Exp[6:0]}

1/2^(32,16,8)
//Fraction with hidden bit * 2^32/ data type adjustment           406
fract_disc[55:0]={mantissa, 0x00000000}>>shr_scale //2^(32,16,8)-1/2
if (signed & negative)//signed negative number
{
  fract_sub[32:0]=fract_disc[55:23]+1
}
else//positive number
{
  fract_sub[32:0]=fract_disc[55:23]-1
}

//generate rounding bits       ⎫
if (signed)                    ⎪
{                              ⎪
  sticky=any fract_disc[22:0]  ⎪
  guard=fract_sub[0]           ⎪
}                              ⎬
else                           ⎪
{                              ⎪
  sticky=|fract_disc[21:0]     ⎪ 408
  guard=fract_disc[22]         ⎪
}                              ⎭

//select result
if (signed)
  integer=fract_sub[32:1]
else
  integer=fract_disc[54:23]
```

FIG. 5F2

```
//Complement
if (signed number and negative)
    int=-integer
else
    int=integer
```
} 410

```
//Round
if (negative && ~guard && ~sticky and && ~zero)
{
 Result=int+1
}
else if (positive && guard && sticky and && ~zero)
{
 Result=int+1
}
else
{
 Result=int
}
End:
```
} 412 AND 414

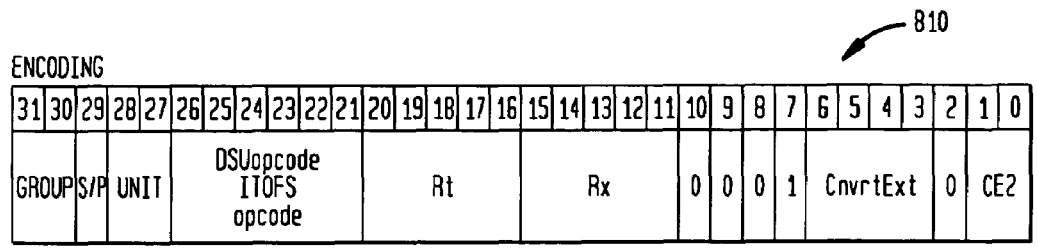

FIG. 8A

ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | UNIT | | | DSUopcode ITOFS opcode | | | | | Rt | | | | | | Rx | | | | 0 | 0 | 0 | 1 | CnvrtExt | | | | 0 | CE2 | |

FIG. 8B

SYNTAX/OPERATION (SIGNED INTEGER)

| INSTRUCTION | OPERANDS | OPERATION | ACF |
|---|---|---|---|
| | | | WORD |
| ITOFS.[SP]D.1SW | Rt,Rx | $Rt \leftarrow \text{ToFloat}((2*Rx+1)/(2^{32}-1))$ | NONE |
| [TF].ITOFS.[SP]D.1SW | Rt,Rx | DO OPERATION ONLY IF T/F CONDITION IS SATISFIED IN F0 | NONE |
| | | | HALFWORD |
| ITOFS.[SP]D.1SH | Rt,RxH0 | $Rt \leftarrow \text{ToFloat}((2*RxH0+1)/(2^{16}-1))$ | NONE |
| [TF].ITOFS.[SP]D.1SH | Rt,RxH0 | DO OPERATION ONLY IF T/F CONDITION IS SATISFIED IN F0 | NONE |
| | | | BYTE |
| ITOFS.[SP]D.1SB | Rt,RxB0 | $Rt \leftarrow \text{ToFloat}((2*RxB0+1)/(2^{8}-1))$ | NONE |
| [TF].ITOFS.[SP]D.1SB | Rt,RxB0 | DO OPERATION ONLY IF T/F CONDITION IS SATISFIED IN F0 | NONE |

FIG. 8C

SYNTAX/OPERATION (UNSIGNED INTEGER) ← 830

| INSTRUCTION | OPERANDS | OPERATION | ACF |
|---|---|---|---|
| | | | WORD |
| ITOFS.[SP]D.1UW | Rt,Rx | $Rt \leftarrow ToFloat(Rx/(2^{32}-1))$ | NONE |
| [TF].ITOFS.[SP]D.1UW | Rt,Rx | DO OPERATION ONLY IF T/F CONDITION IS SATISFIED IN F0 | NONE |
| | | | HALFWORD |
| ITOFS.[SP]D.1UH | Rt,RxH0 | $Rt \leftarrow ToFloat(RxH0/(2^{16}-1))$ | NONE |
| [TF].ITOFS.[SP]D.1UH | Rt,RxH0 | DO OPERATION ONLY IF T/F CONDITION IS SATISFIED IN F0 | NONE |
| | | | BYTE |
| ITOFS.[SP]D.1UB | Rt,RxB0 | $Rt \leftarrow ToFloat(RxB0/(2^{8}-1))$ | NONE |
| [TF].ITOFS.[SP]D.1UB | Rt,RxB0 | DO OPERATION ONLY IF T/F CONDITION IS SATISFIED IN F0 | NONE |

FIG. 8D

1.  Scaled Integer to Floating Point Conversion　　　880

1.1　Floating Point Representation

Single Precision Floating Point Representation:

- Positive range: $2^{-126} \leq Z \leq (2-ulp)2^{127}$ Sign=0
  Minimum: Sign=0, Exponent=00000001, Mantissa=(all 0)
  Maximum: Sign=0, Exponent= 11111110, Mantissa=(all 1)
- Negative range: $-(2-ulp)2^{127} \leq Z \leq -2^{-126}$, Sign=1.
- Zero: Sign=0, Exponent=00000000 and Mantissa=(all 0). No negative zero.
- Infinites: Sign=1 or 0, Exponent=11111111 and Mantissa=(all 0)
- NaN: Sign=1 or 0, Exponent=11111111, Mantissa=(any bitset).

Saturation:

$Z > (2-ulp)2^{127}$ replaced by $Z = (2-ulp)2^{127}$
　　$Z < -(2-ulp)2^{127}$ replaced by $Z = (2-ulp)2^{127}$
　　That is, if Exponent=11111111 , replace by Exponent=11111110 and Mantissa=(all 1)

Forced zero:

If Exponent=00000000 and Mantissa not normalized, replace Mantissa= (all 0) and SIGN=0.

1.2　Description of ITOFS 600 of Fig. 6.

Inputs:

| | | |
|---|---|---|
| | Operations: ITOFS | 604 |
| | Operand:　rx[31..0] | 602 |

Output:

| | | |
|---|---|---|
| | Result:　rt[31..0] := [S(1),EXP(8),FRACT(23)] | 630 |
| | Arithmetic Scalar Flags Z, N | 632 |

Modules: Select input data type 608, Detect overflow 606 and sign selection 610.

Inputs:

| | |
|---|---|
| opcode | -- IFR register |
| data type | -- integer data type target(b, hw, w, ...) |
| control | -- signed/unsigned operation |
| Rx and Rt | -- CRF source and target register addresses |
| rx(S,MAGNITUDE) | -- signed magnitude bit-vector operand |

Outputs:

| | | |
|---|---|---|
| fract-temp[31..0] | -- data type selected input from rx bit-vector | 609 |
| ov_i | -- overflow bit | |
| hx | -- exponent overflow bit | |
| sign_num | -- sign bit | |

FIG. 8E1

Modules: Complement fraction 612. Generate subtract one from exponent bit 616. Generate LSB 614

Inputs:

| | | |
|---|---|---|
| fract_temp[31..0] | -- selected input data type from operand | 609 |
| data type | -- data type decode | |
| sign_num | -- sign bit | |
| rx(S,MAGNITUDE) | -- operand bit-vector | |
| ov_i | -- integer data type larger than floating point fraction size overflow bit | |

Outputs:

| | | |
|---|---|---|
| sx[31:0] | -- complemented operand | 613 |
| lsb | -- lest significant result bit | |
| sub1 | -- exponent subtract control | ← 882 |

Module: Generate exponent 618.

Inputs:

| | | |
|---|---|---|
| sx[31..0] | -- complemented operand | 613 |

Outputs:

| | | |
|---|---|---|
| exp_low[8:0] | -- exponent initial approximation | 615 |

Modules: Update exponent 624. Generate fraction shift amount and select 620. Detect zero 622.

Inputs:

| | | |
|---|---|---|
| exp_low[8..0] | -- exponent initial approximation | 615 |
| sub1 | -- exponent subtract 1 control | |
| lsb | -- result lsb | |
| sx[31:0] | -- complemented input | |

Outputs:

| | | |
|---|---|---|
| shft_amt | -- fraction shift amount | |
| z | -- zero flag | |
| exp_low_acc | -- updated exponent | |
| i-s[31..0] | -- shifted fraction | 621 |

FIG. 8E2

Modules: Data duplication 626. Generate final exponent 634.

Inputs:

| | | |
|---|---|---|
| i_s[31..0] | -- shifted fraction | 621 |
| data type | -- data type | |
| hx | -- fraction max saturation flag | |
| exp_low_acc | -- updated exponent | |
| control | -- signed/unsigned operation | |

Outputs:

| | | |
|---|---|---|
| Exp | -- resultant exponent | 635 |
| i_d[31:0] | -- pre-rounded fraction | 627 |

Modules: Round and final fraction selection 628.

Inputs:

| | | |
|---|---|---|
| i_d[31..0] | -- pre-rounded fraction | 627 |

Outputs:

| | | |
|---|---|---|
| i[31:0] | -- fraction result | 629 |

FIG. 8F1

```
ITOFS Pseudo code
Begin:
sign_num=signed number and negative
//Align data type input
//word
fract_temp[32:0]=(rx[32:1],negative num)
//halfword
fract_temp[32:0]={0000,input[15:0],negative num}
//byte
fract_temp[32:0]={000000,input[7:0],negative num}
//Complement
if (negative)
 fract_temp=~fract_temp
//Detect leading one in fract_temp[32:1] for exponent value
exp_low=DET(fract_temp[32:1])//priority encoder
//Generate exponent control
if ((~signed number && input !=0x00FFFFFF)&&(not negative number || input !=0xFF000000)&&~overflow)
{
 subtract_one=1
}
else
{
 subtract_one=0
}
//Adjust exponent value
if (subtract_one)
{
 exp_low_acc[5:0]=exp_low[5:0]
}
else
{
 exp_low_acc[5:0]=exp_low[5:0]+1
}
```

```
//Generate result
//Detect zero input
if(exp_low==0)
  Result=positive 0
//Generate fraction shift amount
exp_shift={0,~exp_low_acc[4:0]}
//Generate exponent
exp_temp=hw ? 8'h6E+exp_low_acc[5:0]+signed number+data type adjustment:
        (byte ? 8'h76+exp_low_acc[5:0]+signed number+data type adjustment:
        8'h5E+exp_low_acc[5:0]+signed number)
//Generate fraction
if(exp_low_acc[5])
{
  i[31:0]=fract_temp[32:1]
}
else
{
  i[31:0]=fract_temp[31:0]<<exp_shift[4:0]
}
//fraction duplication unit
i=(hw 1 byte)?(byte?{i[31:24],i[31:24],i[31:24],i[31:24]}:{i[31:16],i[31:16]}):i[31:0];

//Generate round bits
sticky_i=(|i[6:0]);
round=i[7];

//round
if ((((i[8]&round)|(~i[8]&round&(sticky_i|hw|byte)))&~sign_num)|
    (((i[8]&round)|(~i[8]&round&(sticky_i|hw|byte)))&sign_num))
{
  i[30:8]=i[30:8]+1;
}
else
{
  i[30:8]=i[30:8];
}

End:
```

PROCESSOR EFFICIENT TRANSFORMATION AND LIGHTING IMPLEMENTATION FOR THREE DIMENSIONAL GRAPHICS UTILIZING SCALED CONVERSION INSTRUCTIONS

The present application claims the benefit of U.S. Provisional Application Ser. No. 60/368,509 filed Mar. 29, 2002, which is incorporated by reference herein in its entirety.

FIELD OF INVENTION

The present invention relates generally to the use of specialized scaled floating point/integer conversion instructions for providing an efficient number system conversion for a variety of applications, and more particularly to advantageous methods and apparatus for use in the transformation and lighting stage of a three dimensional (3D) graphics pipeline. To this end, the present invention addresses details of methods and apparatus for calculating the result of a conversion to and from a floating point fraction to a variety of integer data sizes including 8 bit, 16 bit and 32 bit signed and unsigned integer formats. Furthermore, the present invention describes aspects of the use of such operation for efficient implementation of the transformation and lighting portion of a 3D graphics pipeline executing on a scalable processor.

BACKGROUND OF THE INVENTION

Floating point to integer and integer to floating point conversions are typically implemented by software routines in numerical processors that support both floating point and integer numbers. For example, for 3D graphics, the texture coordinates (S, T) are specified by values of floating point numbers between 0.0 and 1.0. These coordinates are typically interpolated by a rasterizer, which then stores red, green, blue and alpha (RGBA) values to a frame buffer and the interpolated texture coordinates are stored in a texture buffer. The alpha value defines a transparency measure with alpha equal 1 being opaque and alpha equal 0 being fully transparent. When compositing two images, the resulting color is a linear combination of red, green and blue (RGB) and alpha values of the pixels.

A typical 3D graphics application consists of both transforms and lighting, and rasterization. An efficient implementation of the 3D graphics pipeline can be achieved by the use of different data types between texture coordinate interpolation and texture mapping calculations, hence the need for rapid conversion between data types. In order to increase performance of the implementation of the transform and lighting portion of the 3D pipeline, it has been recognized that efficient scaled conversion operations are especially important.

SUMMARY OF THE INVENTION

Among its various aspects, the invention addresses the instructions needed to convert a floating point number with a value in the range of 0.0 and 1.0 to a scaled integer value for a variety of data sizes and the reverse operation. In a presently preferred embodiment, these special instructions are applied to the 3D graphics pipeline to improve the efficiency of the transformation and lighting task for processors, providing a significant performance increase for 3D graphics applications for various processors utilizing floating point based applications. In another aspect, scaling, mixed data type support and improvements to parallel processing are added advancements to a typical conversion operation, and, a substantial reduction in texture buffer size is achieved. Further, a scaled number system conversion module is described herein which may be advantageously used to convert interpolated texture data to a scaled integer output. This approach can reduce the amount of memory required. Once all the interpolated texture data is stored, the scaled number system conversion module can be used to convert the saved texture coordinates to a floating point number in the range of 0.0 to 1.0. The converted data is then used to index the texture map to retrieve the RGBA data used to modify the frame buffer.

A more complete understanding of the present invention, as well as further features and advantages of the invention, will be apparent from the following detailed description and the accompanying drawings.

BRIEF DESCRIPTION OF THE DRAWINGS

FIGS. 3A and 3B illustrate further details of a 3D pipeline;

FIG. 5A illustrates a presently preferred encoding for a floating point to scaled integer (FTOIS) conversion instruction in accordance with the present invention;

FIG. 5B is a table illustrating various aspects of single precision floating point to scaled integer conversion in accordance with the present invention;

FIG. 5C shows a convert extension (Cnvrt Ext), or data type, table in accordance with the present invention;

FIG. 5D is a syntax/operation table for signed integer operation utilizing the FTOIS instruction of FIG. 5A in accordance with the present invention;

FIG. 5E is a syntax/operation table for unsigned operation utilizing the FTOIS instruction of FIG. 5A in accordance with the present invention;

FIG. 5F shows exemplary pseudo code illustrating the functions of the FTOIS instruction in pseudo code format in accordance with the present invention;

FIG. 8A illustrates a presently preferred encoding for an integer to scaled floating point (ITOFS) conversion instruction in accordance with the present invention;

FIG. 8B is a syntax/operation table for signed integer operation utilizing the ITOFS instruction of FIG. 8A in accordance with the present invention;

FIG. 5C is a syntax/operation table for unsigned integer operation utilizing the ITOFS instruction of FIG. 8A in accordance with the present invention;

FIGS. 5D and 8E show a table of an I/O data path representation of the ITOFS instruction in accordance with the present invention; and FIG. 8F shows exemplary pseudo code illustrating the functions of the ITOFS instruction in pseudo code format in accordance with the present invention.

DETAILED DESCRIPTION

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Figure 1:
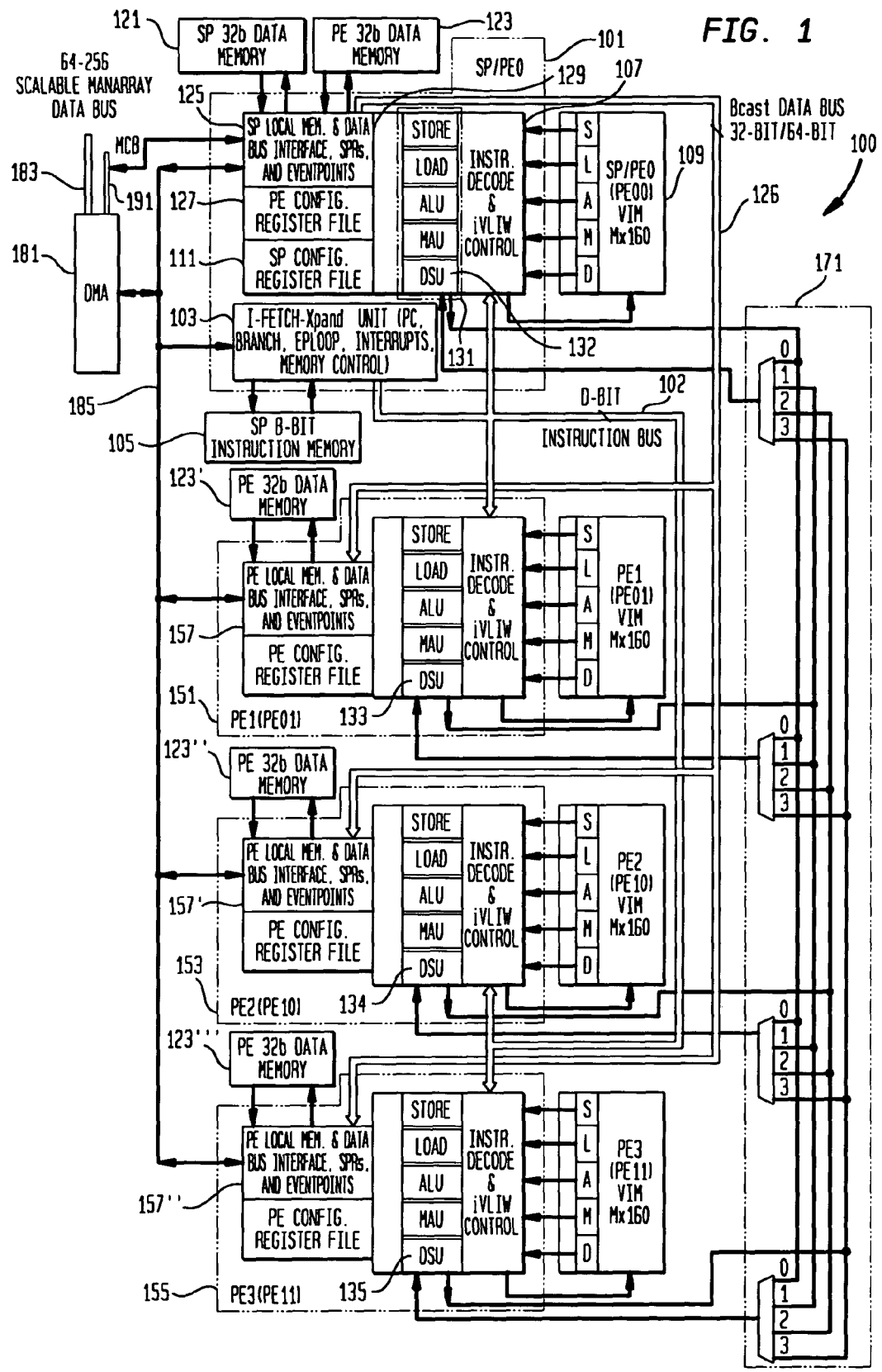
FIG. 1 illustrates an exemplary ManArray architecture for use in conjunction with the present invention.

In a presently preferred embodiment of the present invention, a ManArray 2×2 iVLIW single instruction multiple data stream (SIMD) processor 100 as shown in FIG. 1 may be adapted as described further below for use in conjunction with the present invention. Processor 100 comprises a sequence processor (SP) controller combined with a processing element-0 (PE0) to form an SP/PE0 combined unit 101, as described in further detail in U.S. patent application Ser. No. 09/169,072 entitled "Methods and Apparatus for Dynamically Merging an Array Controller with an Array Processing Element". Three additional PEs 151, 153, and 155 also illustrate execution units suitable for use in conjunction with the present invention. It is noted that the PEs can be also labeled with their matrix positions as shown in parentheses for PE0 (PE00) 101, PE1 (PE01) 151, PE2 (PE10) 153, and PE3 (PE11) 155. The SP/PE0 101 contains an instruction fetch (I-fetch) controller 103 to allow the fetching of short instruction words (SIW) or abbreviated-instruction words from a B-bit instruction memory 105, where B is determined by the SIW format or an application instruction-abbreviation process to be a reduced number of bits representing ManArray native instructions and/or to contain two or more abbreviated instructions as further described in U.S. Pat. No. 6,408,382 filed Oct. 21, 1999.

In one aspect of the present invention, if an instruction abbreviation apparatus is not used, then B is determined by the SIW format. The fetch controller 103 provides the typical functions needed in a programmable processor, such as a program counter (PC), a branch capability, eventpoint loop operations (see U.S. application Ser. No. 09/598,566 entitled "Methods and Apparatus for Generalized Event Detection and Action Specification in a Processor" filed Jun. 21, 2000 for further details), and support for interrupts. It also provides the instruction memory control which could include an instruction cache if needed by an application. In addition, the I-fetch controller 103 dispatches instruction words and instruction control information to the other PEs in the system by means of a D-bit instruction bus 102. D is determined by the implementation, which for the exemplary ManArray coprocessor D equals 32 bits. The instruction bus 102 may include additional control signals as needed in an abbreviated-instruction translation apparatus.

In this exemplary system 100, common elements are used throughout to simplify the explanation, though actual implementations are not limited to this restriction. For example, the execution units 131 in the combined SP/PE0 101 can be separated into a set of execution units optimized for the control function, for example, fixed point execution units in the SP, and the PE0 as well as the other PEs can be optimized for a floating point application. For the purposes of this description, it is assumed that the execution units 131 are of the same type in the SP/PE0 and the PEs. In a similar manner, SP/PE0 and the other PEs use a five instruction slot iVLIW architecture which contains a VLIW memory (VIM) 109 and an instruction decode and VIM controller functional unit 107 which receives instructions as dispatched from the SP/PE0's I-fetch unit 103 and generates VIM addresses and control signals 108 to access the iVLIWs stored in the VIM. Referenced instruction types are identified by the letters SLAMD in VIM 109, where the letters are matched up with instruction types as follows: Store (S), Load (L), Arithmetic Logic Unit or ALU (A), Multiply Accumulate Unit or MAU (M), and Data Select Unit or DSU (D).

The basic concept of loading the iVLIWs is described in further detail in U.S. Pat. No. 6,151,668. The SP/PE0 and the other PEs may also advantageously contain a common design PE configurable register file 127 which is described in further detail in U.S. Pat. No. 6,343,356. Due to the combined nature of the SP/PE0, the data memory interface controller 125 must handle the data processing needs of both the SP controller, with SP data in memory 121, and PE0, with PE0 data in memory 123. The SP/PE0 controller 125 also is the controlling point of the data that is sent over the 32 bit or 64 bit broadcast data bus 126. The other PEs, 151, 153, and 155 contain common design physical data memory units 123', 123", and 123''' though the data stored in them is generally different as required by the local processing done on each PE.

The interface to these PE data memories is also a common design in PEs 1, 2, and 3 and is indicated by PE local memory and data bus interface logic 157, 157' and 157". Interconnecting the PEs for data transfer communications is the cluster switch 171 various aspects of which are described in greater detail in U.S. Pat. Nos. 6,023,753, 6,167,501 and 6,167,502. The interface to a host processor, other peripheral devices, and/or external memory can be done in many ways. For completeness, a primary interface mechanism is contained in a direct memory access (DMA) control unit 181 that provides a scalable ManArray data bus (MDB) 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray control bus (MCB) 191 is also shown in FIG. 1. The ManArray architecture uses two primary bus interfaces: the ManArray data bus (MDB), and the ManArray control bus (MCB). The MDB provides for high volume data flow in and out of the DSP array. The MCB provides a path for peripheral access and control. The width of either bus may be varied for different implementations. The width of the MDB is set according to the data bandwidth requirements of the array in a given application, as well as the overall complexity of the on chip system.

In one aspect, the present invention extends the ManArray architecture and instruction set to more efficiently compute and manage texture coordinates in 3D graphics pipeline processing and to improve the efficiency of tasks, such as transformation and lighting, and the like. Before addressing specific hardware and software improvements, various aspects of a 3D pipeline in accordance with the present are addressed.

Figure 2:
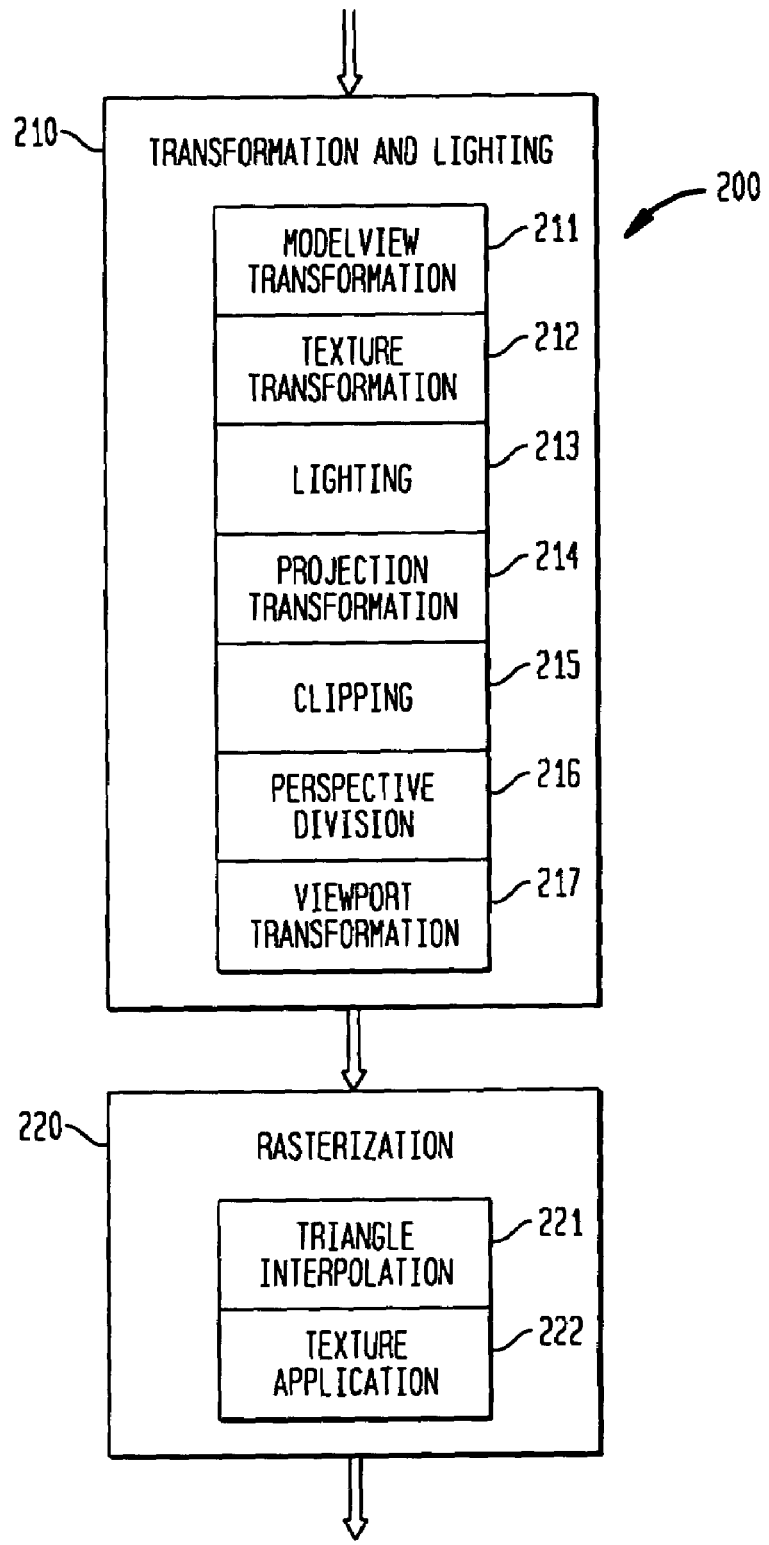
FIG. 2 illustrates a block diagram of a 3D pipeline.

As seen in FIG. 2, a 3D pipeline 200 can be broken down into two main stages a transformation and lighting (T&L) stage 210, and a rasterization stage 220. The T&L and rasterization stages are typically broken down into further substages, such as modelview transformation substage 211, texture transformation substage 212, lighting substage 213, projection transformation substage 214, clipping substage 215, perspective division substage 216, viewport transformation substage 217, and triangle interpolation substage 221 and texture application substage 222, respectively, as further illustrated in FIG. 2. During T&L stage 210, a series of floating point intensive operations that operate on the range [0.0, 1.0] are performed. The transformation and lighting stage 210 of the 3D pipeline 200 takes a stream of triangle vertices as its input. Each vertex has certain parameters associated with it that describes the vertex to the 3D pipeline. These parameters can include the vertex location (X, Y, Z), texture coordinates (S, T), texture name, and vertex color (RGBA). The texture name is defined as an integer in the range from [1,65535] that gets "bound" to a texture map. A zero value means the triangle is not textured. It should be noted that other parameters may be associated with each vertex. The (S, T) coordinates are floating point numbers in the range [0.0, 1.0], and are transformed by a texture transformation matrix which can translate, rotate, and scale the texture coordinates. After the (S, T) coordinates are transformed, they are sent through a perspective division stage of the 3D pipeline, which introduces perspective foreshortening into the texture and coordinates. The output of the T&L stage 210 comprises the color, location, and texture coordinates of a stream of triangle vertices.

The rasterization stage 220 of the 3D pipeline 200 takes this stream as input, and warps the (S, T) coordinates to bring them within the range [0.0, 1.0] before they are interpolated by substage 221. The warping function extracts the fractional part of the (S, T) coordinates, for example, warp(1.742)=0.742. The rasterizer then interpolates (RGBA), (S, T), and Z coordinates of each triangle in the stream. The interpolated RGBA values are stored in a buffer called the frame buffer, and the Z coordinates are stored in a depth buffer. The (S, T) coordinates, however, are converted from floating point to integers on the range [0, 255]. These two 8 bit numbers are then packed into a register along with the texture name for the current triangle and stored in the texture buffer. Once all of the triangles in the input stream have been interpolated and stored, the rasterizer then goes through the texture buffer and loads the texture coordinates for a pixel. These texture coordinates are then converted from 8 bit integers to floating point in the range [0.0, 1.0] and scaled to the size of the texture so that they may be used to fetch the RGBA values found at location (S, T) in the texture map bound to the current pixel being evaluated. After the texture RGBA values have been retrieved, they are used to modify the RGBA values for the current pixel in the frame buffer.

Figure 3A:
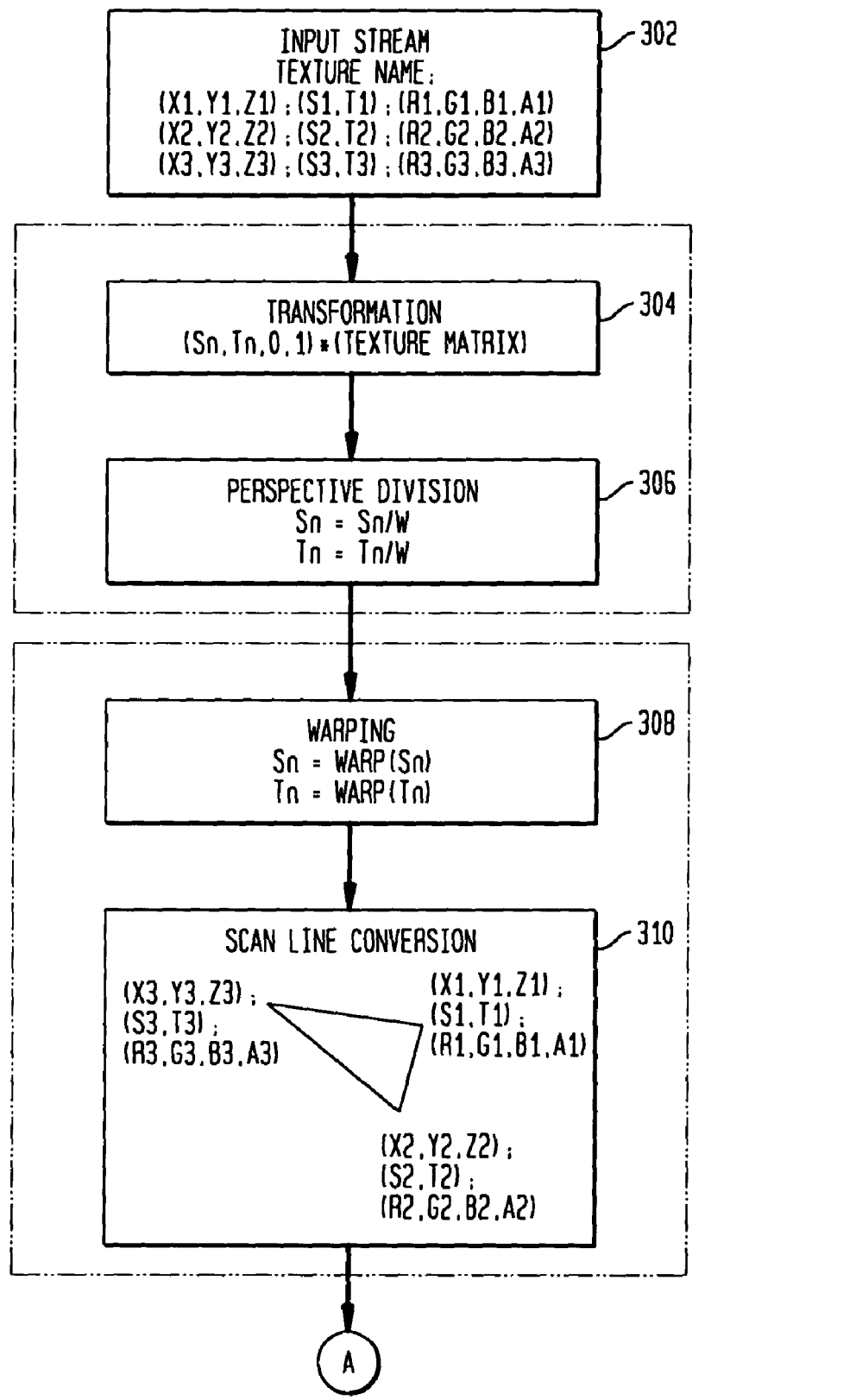

Further details of an input triangle stream and the parameters utilized to rasterize and texture one triangle utilizing single precision floating point to integer scaled (FTOIS) and integer to single precision floating point scaled (ITOFS) instructions are shown in the flowchart for process 300 of FIGS. 3A and 3B.

In step 302, an input stream is provided to a T&L stage of a 3D pipeline. In step 304, a texture transformation is performed on the input stream. For example, a 4×4 transformation matrix which describes any translation, rotation or scale is applied to the texture coordinates. The results are (S,T) values that are not necessarily on the range [0.0, 1.0]. In step 306, perspective division is performed. Perspective division introduces perspective foreshortening into the texture coordinates. W represents the depth of the vertex. See, Edward Angle, Interactive Computer Graphics, Second Edition, 2000 for further information on perspective division and 3D pipelines more generally.

The output from the T&L stages of the 3D pipeline are provided to the rasterization stages as discussed generally above. In step 308, a warping function is applied. The warping function extracts the fractional part of the floating point texture coordinates $(S_n, T_n)$. This extraction insures that the results are on the range [0.0, 1.0].

In step 310, scan line conversion is applied. At this stage of processing, each parameter of the triangle is interpolated, and the values of (S,T) of each pixel in the triangle are determined. These values are converted from single precision floating point numbers, to 8 bit integers with the FTOIS instruction. The 8 bit texture coordinates are packed with the texture name and stored in a texture buffer.

In step 312, texture mapping is performed. During texture mapping, the (S,T) values for each pixel and the texture name associated with that pixel are loaded, and these values are used as an index into the texture. Texture mapping occurs after all of the triangles have been interpolated. The 8 bit texture coordinates are converted back to single precision floating point format in the range [0.0, 1.0] with the ITOFS instruction. The floating point S coordinates is multiplied by the width of the texture and the T coordinate is multiplied by the texture height. This multiplication has the effect of scaling the (S, T) coordinates to the size of the texture, the results of which are used as an index into the two dimensional texture to retrieve the RGBA values of the texture at that location. This texture RGBA value is then applied to the current pixel in the frame buffer. Finally, in step 314, a rasterized and textured 3D scene is output.

As seen above, FTOIS is used as an interface between the T&L stage, and the rasterization stage of the pipeline. The texture coordinates (S, T) are interpolated by the rasterizer in floating point, but before they are stored to the texture buffer, they are converted to bytes on the range [0, 255] with the FTOIS instruction. This conversion reduces the size of the texture buffer. Instead of having to store two 32 bit floating point numbers per textured pixel, only two 8 bit integers need to be stored per textured pixel. Further details on FTOIS are presented below.

ITOFS is used in the texture lookup portion of rasterization because the texture coordinates (S,T) were stored as bytes during interpolation, but they need to be converted to floating point within the range [0.0, 1.0] for texture lookup. This conversion is necessary because the texture coordinates have to be scaled to the size of the texture before they can be used as an index into the texture. Once the triangle stream has been interpolated, and all of the texture coordinates have been stored, the textures need to be applied to all of the textured pixels in the texture buffer. Textures are applied by loading each of the (S, T) coordinates and using them as an index into the texture map bound to the current pixel. However, before the (S, T) coordinates can be used as the texture index, they must be scaled to the size of the texture. In order to scale (S, T), these coordinates must be converted back to floating point numbers in the range [0.0, 1.0], and then they must be multiplied by the width and height of the texture respectively. The following formulas show how to get the (X, Y) indices for a texture from the (S, T) values stored in the texture buffer: index_X=(int) (ITOFS(S)*TEXTURE_WIDTH), and index_Y=(int) (ITOFS(T)*TEXTURE_HEIGHT).

In one embodiment, the 3D graphics pipeline is parallelized and programmed on a parallel processor, such as the processor 100 shown in FIG. 1. The FTOIS and ITOFS instructions may be executed in the DSU unit of PEs 132, 133, 134 and 135. Further details on ITOFS are provided below.

Figure 4:
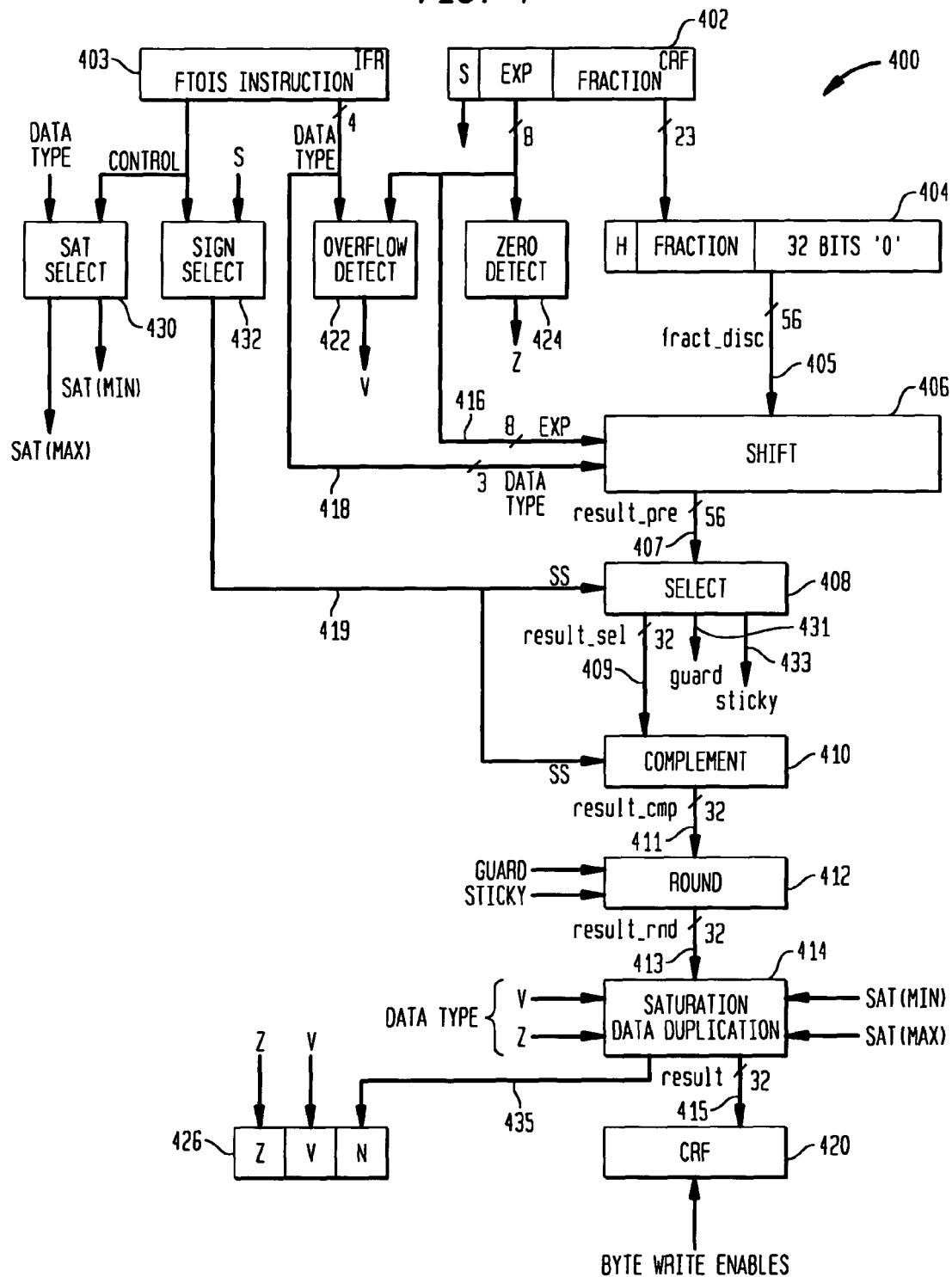
FIG. 4 illustrates the single precision floating point to integer scaled (FTOIS) conversion instruction data path in accordance with the present invention.

In general, methods and apparatus for a high speed floating point conversion unit are described herein which can be used for a plurality of different number systems in which an application requires the conversion of a floating point number in the range of −1 to 1 for signed numbers and 0 to 1 in unsigned numbers to a scaled integer representation. In a presently preferred implementation, a single floating point conversion module, such as module 400 of FIG. 4, can convert input signal samples to a plurality of output data sizes in an unsigned number system or a signed number system which may or may not be a two's complement representation. For clarity of illustration, the module 400 illustrates the general data paths, but does not show all signal paths.

Signal samples are input into the floating point conversion unit 400 via a source register, such as register 402. The FTOIS instruction is received in a PE's instruction fetch register (IFR) 403 which provides opcode, data type, signed or unsigned operation, rounding type, source register address Rx, target register address Rt, and conditional execution information that specifies the desired function. See FIGS. 5A–5E for further details on the FTOIS instruction. Source register 402 may be a selected register from a register file, such as the CRF used in the SP and PEs described above. The outputs of register 402 include a sign bit, exponent bits 416, and fraction bits in a variety of sizes. Zero detect module 424 sets a zero detect bit, or Z flag. Overflow detection module 422 sets an overflow detect bit, or V flag. Sign selection module 432 determines the sign select bit 419. Saturation select module 430 determines the minimum and maximum saturation which is dependent on whether a signed or unsigned integer conversion is specified.

The fraction bits from register 402 are left justified with a hidden bit and zero padding bits into a field of bits, such as block 404, representing the basic format of this 56 bit field of bits, to produce a preshifted fraction signal 405. Next, the exponent bits 416 are used to determine the fraction shift amount. The fraction is shifted to the right in the shift unit 406 by the calculated shift amount plus an offset determined by the target data type, such as byte, half-word, or word, obtained from the data type field 418, or CnvrtExt field of FIG. 5A, to determine a shifted fraction signal, result_pre 407, which is provided to a select unit 408. In the select unit 408, the input for signed numbers is selected according to the data type, starting from the most significant bit (MSB) of the input representation down to the least significant bit (LSB) of the specified data type size and one is subtracted for an asymmetric number system. In this example, the largest data type is one 32 bit word. No subtraction is needed for a symmetric number system. For unsigned numbers, the input is selected according to the data type starting with one bit less than the MSB down to the LSB of the specified data type size. The selected result output, result_sel 409, is provided to a complement unit 410. A guard bit 431 and a sticky bit 433 are also output by the select unit 408.

In a preferred embodiment, for the case of negative signed conversions, the shifted fraction is one's complemented in complement unit 410 to produce a complemented output, result_cmp 411, which is provided to a round unit 412. Rounding and a combined addition of one to complete the two's complement is performed in the round unit 412 based on result_cmp 411, the guard bit 431 and the sticky bit 433. The result is rounded output, result_rnd 413, which is provided to a saturation and result formatting unit 414. The approach used in round unit 412 combines the signed number subtraction step for asymmetric numbers with two's complement conversion and rounding to improve latency. For unsigned numbers, the two's complement step is skipped and the value is rounded. From the exponent and fraction parts of the register input 402 for the selected data type as specified by the data type field 418, overflow and zero inputs are detected in overflow detector 422 and zero detector 424, respectively. Overflow and zero flags are saved in arithmetic flag storage 426. The final result is duplicated depending on the data type as selected by the data type field 418. The final result 415 can then be selected in the saturation and result formatting unit 414 by multiplexing the rounded data path results 413 with overflow and underflow clamped results internally generated in unit 414 depending on the output data type and whether there is an overflow or underflow situation. Finally, the result 415 is written in a destination register, such as CRF register 420. The N bit 435, or most significant bit, is stored in storage 426. The floating point conversion unit may share resources with other conversion units, such as the ITOFS unit, with negligible impact on critical path.

A presently preferred FTOIS instruction encoding format 500 operable in the DSU to convert single precision floating point to integer scaled is shown in FIG. 5A. A table 510 summarizing single precision floating point to scale integer result conversion and arithmetic flags with values −1, 0 and +1 is shown in FIG. 5B. A convert extension (Cnvrt Ext) table 515 specifying the data type is shown in FIG. 5C. Syntax/operation tables 520 and 530, for signal integer and unsigned integer operation, respectively, are shown in FIGS. 5D and 5E.

The source operand Rx is converted from a single precision floating point value to a scaled (signed or unsigned) integer word, halfword or byte result that is loaded into target register Rt. Other format conversions as specified by the CnvrtExt data type field 515 for packed data formats 517 may also be utilized. For signed integer conversion, the floating point value is assumed to be in the range −1.0 to 1.0 and is converted to either a signed word ($-2^{31}$ to $2^{31}-1$) or a signed halfword ($-2^{15}$ to $2^{15}-1$) or a signed byte ($-2^{7}$ to $2^{7}-1$). For unsigned integer conversion the floating point value is assumed to be in the range 0.0 to 1.0 and is converted to either an unsigned word (0 to $2^{32}-1$) or an unsigned halfword (0 to $2^{16}-1$) or an unsigned byte (0 to $2^{8}-1$). The result of converting a negative floating point value to an unsigned integer is zero, and the V flag is set to 1. If the floating point value is not in the specified range, then the result is asymmetrically saturated and the V flag is set to a 1.

FIG. 5F shows exemplary pseudo code 590 illustrating the basic data flow of the FTOIS instruction in pseudo code format. For ease of reference, the pseudo code 590 is numbered with the element numbers of FIG. 4 to show how the pseudo code corresponds to some of the functional blocks of FIG. 4.

In general, methods and apparatus for a high speed integer conversion unit are described herein which can be used for a plurality of different number systems in which an application requires the conversion of an integer number in any range to a floating point number in the range of −1 to 1 for signed numbers and 0 to 1 for unsigned numbers. In the presently preferred implementation, a single integer conversion module, such as module 600 of FIG. 6, can convert a plurality of input signal samples to a floating point output in an unsigned number system or a signed number system which may or may not be a two's complement representation. For clarity of illustration, the module 600 illustrates the general data paths, but does not show all signal paths.

Signal samples are input into the integer conversion unit via a source input register, such as register 602. The ITOFS instruction is received in a PE's instruction fetch register (IFR) 604 which provides opcode, data type, signed or unsigned operation, rounding type, source register address Rx, target register address Rt, and conditional execution information that specifies the desired function. See FIGS. 8A–8C for further details on the ITOFS instruction opcode. Source register 602 may be a selected register from a register file, such as the CRF used in the SP and PE's described above. The data stored in the source register 602 may be a sign magnitude representation in a variety of data sizes. In a presently preferred embodiment, data internal to the unit 600 can be represented as either signed two's complement numbers or unsigned numbers.

A multiplexing array 608 controls all data type formats in a single module. The input signal data stored in register 602 is left shifted one bit by input multiplexer 608 and complemented by complement unit 612 in the case of signed negative numbers. The LSB of this value is then set if the input data is signed. A more detailed description of the data path and modules of FIG. 6 follows this basic operational description.

The internal register data can then be used to calculate the necessary shift amount for the fraction portion of the result and the final exponent result. In the case of data types, which employ more data bits than fraction bits available in the floating point representation of choice, a special adjustment is made to the exponent and fraction portions of the result. When this case is detected, a one is added to the exponent and the fraction is shifted one extra bit to the left. To support data types smaller than the chosen floating point representation, special attention is given to maximum signed and unsigned numbers. When maximum and minimum input signals are detected, the exponent must be adjusted to produce the corrected output result. For the case of data types exhibiting fewer bits than that of the target floating point result, a data size duplication module 626 is utilized.

Figure 7A:
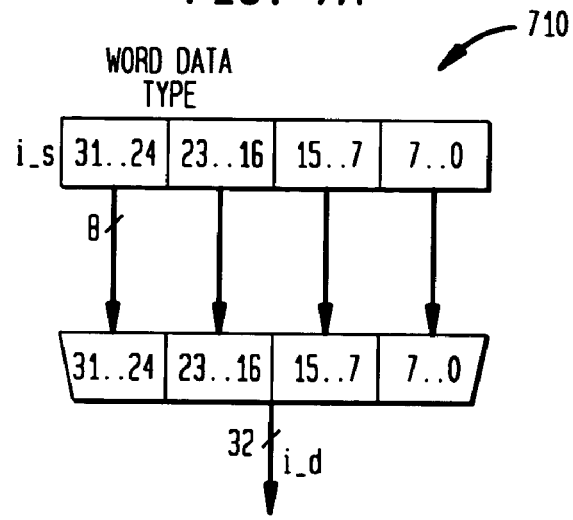
FIGS. 7A, 7B and 7C illustrate data duplication units for word data, byte data and halfword data types, respectively, in accordance with the present invention.
Figure 7B:
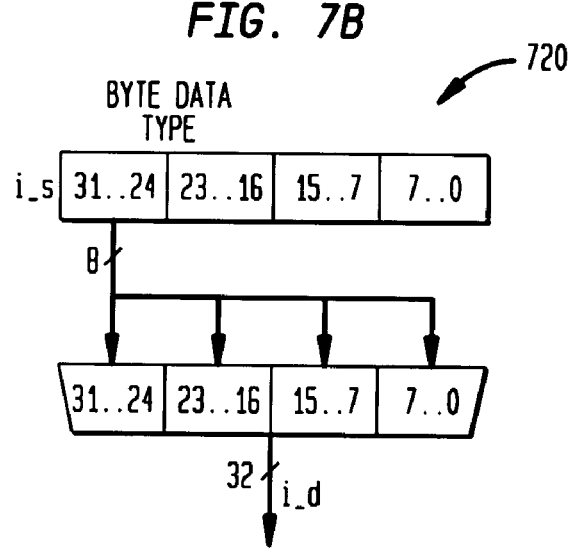
Figure 7C:
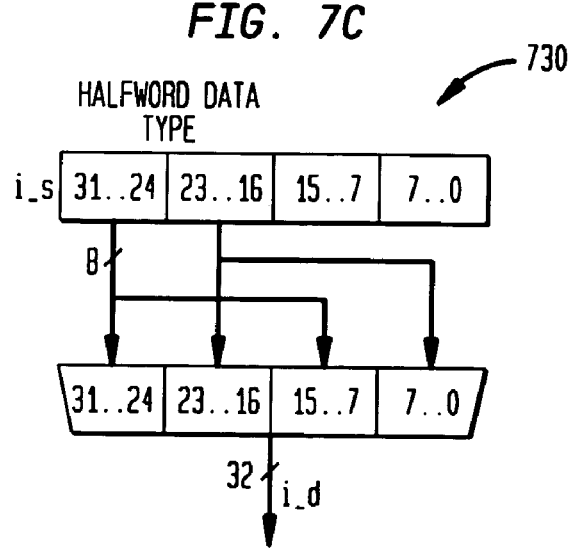

Exemplary word, byte and halfword data duplication modules 710, 720 and 730 are shown in FIGS. 7A, 7B and 7C, respectively. This replication can be accomplished by multiplexing the input data type size bits located in the most significant bits of the result into the lower bits. Finally, the result can be rounded per the rounding mode selected.

A presently preferred encoding format 810 for an ITOFS instruction to convert integer to single precision floating point scaled is shown in FIG. 8A. Syntax/operation tables 820 and 830 are for signed integer and unsigned integer operation are shown in FIGS. 8B and 8C, respectively.

The source operand Rx is converted from a (signed or unsigned) integer word, halfword, or byte to a single precision floating point value, scaled according to the operand size and loaded into target register Rt. Other format conversions as specified by the CnvrtExt data type field 515 for packed data formats 517 may also be utilized. The result for a signed integer conversion is a value between −1.0 and +1.0. The result for an unsigned integer conversion is a value between 0.0 and 1.0.

Figure 6:
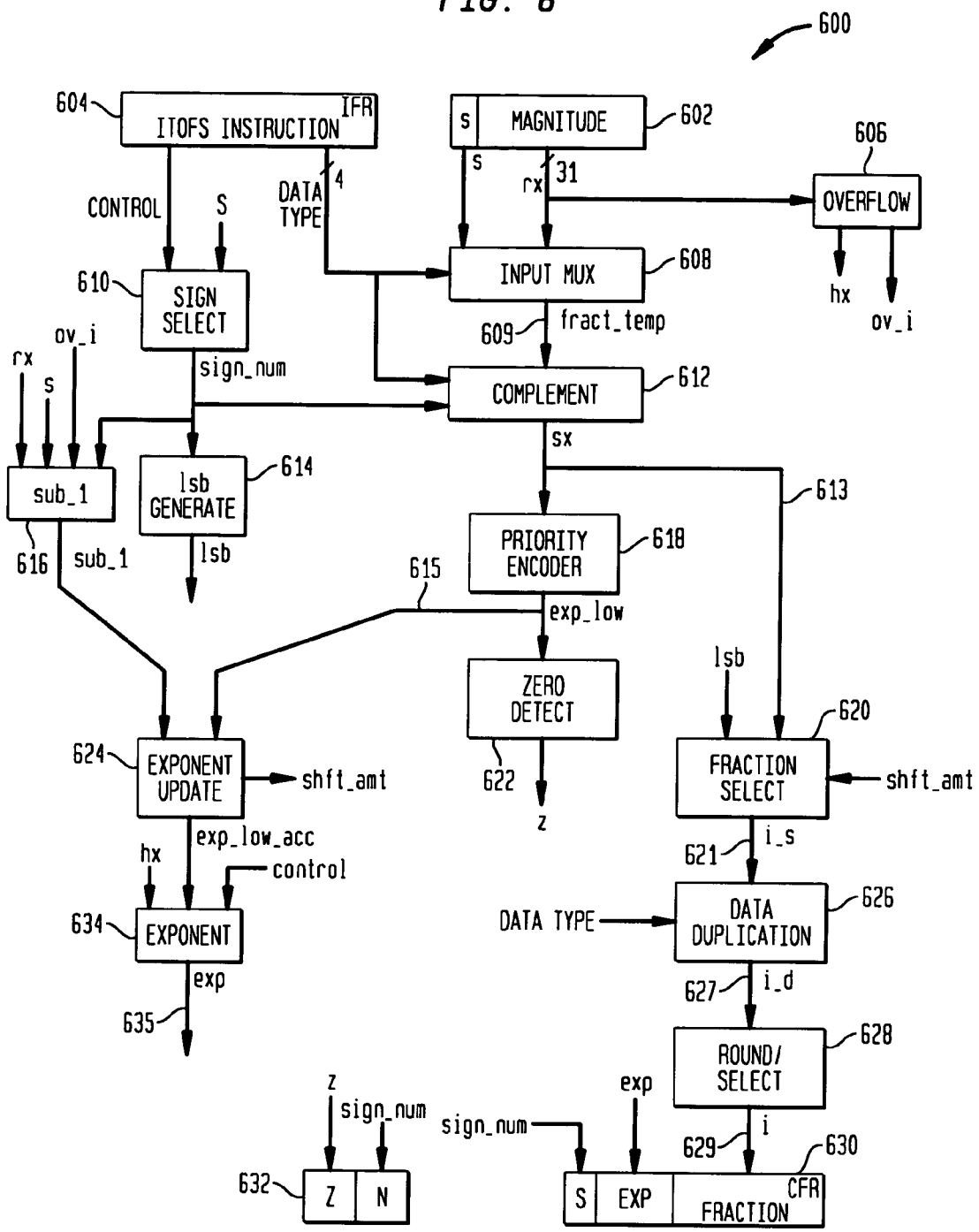
FIG. 6 illustrates the integer to single precision floating point scaled (ITOFS) conversion instruction data path in accordance with the present invention.

Further details of a presently preferred operation of the ITOFS instruction are provided in the tables 880 and 882 of FIGS. 8D and 8E which illustrate an input/output (I/O) data path representation of the module 600 of FIG. 6. For ease of reference, the tables 880 and 882 include the element numbers of logic modules and signals which correspond with FIG. 6.

FIG. 8F shows an exemplary pseudo code 890 illustrating the basic data flow of the ITOFS instruction in pseudo code format.

While the present invention is disclosed in a presently preferred context, it will be recognized that the teachings of the present invention may be variously embodied consistent with the disclosure and claims. By way of example, the present invention is disclosed in connection with specific presently preferred instructions and various aspects of the ManArray architecture. It will be recognized that the present teachings may be adapted to other instructions and to other present and future architectures to which they may be beneficial, or the ManArray architecture as it evolves in the future.

We claim:

1. An apparatus for executing a programmable floating point to integer scaled (FTOIS) instruction, the apparatus comprising:
   a first input for receiving an FTOIS instruction, the FTOIS instruction including a target data type;
   a second input for receiving a floating point number, the floating point number including fraction bits and exponent bits;
   a floating point conversion module having a saturation and result formatting unit, the floating point conversion module calculating a fraction shift amount based on the exponent bits and shifting the fraction bits by the fraction shift amount plus an offset determined by the target data type, the floating point conversion module rounding the shifted fraction bits, the saturation and result formatting unit generating overflow and underflow results depending on the target data type and whether there is an overflow or underflow situation, the saturation and result formatting unit determining a scaled integer number by multiplexing the rounded bits with either overflow or underflow results, said scaled integer number comprising fewer bits than the input floating point number.

2. The apparatus of claim 1 wherein the floating point number comprises a texture coordinate.

3. The apparatus of claim 1 wherein the scaled integer number is stored in a data type format selected from a plurality of data types.

4. The apparatus of claim 3 wherein the selected data type format is a byte in the range of 0 to 255.

5. The apparatus of claim 3 wherein the scaled integer number is duplicated depending on the selected data type format.

6. The apparatus of claim 1 wherein the floating point number is a single precision number in the range of 0.0 to 1.0.

* * * * *